United States Patent

[11] 3,548,083

[72] Inventor Raymond Cahen
Paris, France

[21] Appl. No. 686,102
[22] Filed Nov. 28, 1967
[45] Patented Dec. 15, 1970
[73] Assignee CSF-Compagnie Generale De Telegraphie Sans Fil
a corporation of France
[32] Priority Dec. 14, 1966
[33] France
[31] No. 87414

[54] COLOUR TELEVISION CAMERAS
6 Claims, 4 Drawing Figs.

[52] U.S. Cl. 178/5.4
[51] Int. Cl. H04n 9/48
[50] Field of Search 178/5.4, 5.44TCC, 5.4, 5.2, 5.2A, 7.3DC, 7.1DC

[56] References Cited

UNITED STATES PATENTS

| | | | |
|---|---|---|---|
| 3,102,163 | 8/1963 | Sennhenn | 178/7.1 |
| 3,198,882 | 8/1965 | Sennhenn | 178/7.1 |
| 3,223,778 | 12/1965 | Stone | 178/7.1 |

*Primary Examiner*—Richard Murray
*Assistant Examiner*—John C. Martin
*Attorney*—Cushman, Darby & Cushman

ABSTRACT: A colour television camera having a single control, possibly automated, of the black level resetting and the gain, in the correcting circuits associated with the camera tubes. The aperture of the iris is made automatically a function of the illumination of the televised scene.

COLOUR TELEVISION CAMERAS

The present invention relates to colour television cameras. More particularly it is an object of this invention to provide a colour television camera in which the control operations are reduced, whilst at the same time ensuring the best possible signal transmission conditions.

In operation of a conventional black and white television camera, which usually incorporates only one camera tube, the operations are limited, in the present state of the art, to three essential adjustments:

adjustment of the iris aperture to obtain the best illumination conditions;

black level setting, by bottom clipping the signal i.e. bringing the reference level and the minimum luminosity level of the pictures being transmitted (the latter is always higher than absolute black) into line with one another;

gain control associated with the above control functions, in order to reestablish the full signal amplitude.

Thus a black-to-white range is obtained which corresponds to the nominal signal level range (0—1 volts) in the video channel.

In operating colour television cameras, in particular where the response of the camera television tubes is generally linear within the ordinary operating range, the control of the iris aperture is a more delicate procedure since it has practically the same effect as the adjusting of the gain. In addition, the black level resetting and the gain adjustment, are to be repeated as many times as there are tubes, of which there are generally three (one per primary colour), and sometimes four when a particular tube is used for directly supplying the luminance signal.

This multiplicity of control functions requires the attendance of a large number of skilled specialists but even then it is not absolutely sure that optimum operation will be achieved at each instant.

It is an object of the present invention to overcome these drawbacks.

According to the invention there is provided a colour television camera comprising: a plurality of camera tubes having a predetermined black-level-to-maximum-illumination output range; an optical system positioned for directing luminous energy on said tubes, said system comprising an iris; a correction system associated with said tubes for receiving electrical signals therefrom; first means associated with said correction system for setting the black level of said signals to said black level, thus providing black level reset signals; second means associated with said correction system for amplifying said reset signals to restore said range, said second means including third means for adjusting the gain of said amplifying means; said first and third means having respective control means; and means for ganging said respective control means for simultaneous operation thereof.

The invention may be advantageously applied to cameras as described in the copending U.S. Pat. application for "Improvements Relating to the Treatment of Characteristic Signals of a Colour Television Pictures", Ser. No. 653,503, filed July 14, 1967.

For a better understanding of the invention and to show how the same may be carried into effect reference will be made to the drawing accompanying the following description and in which.

Figure 1:
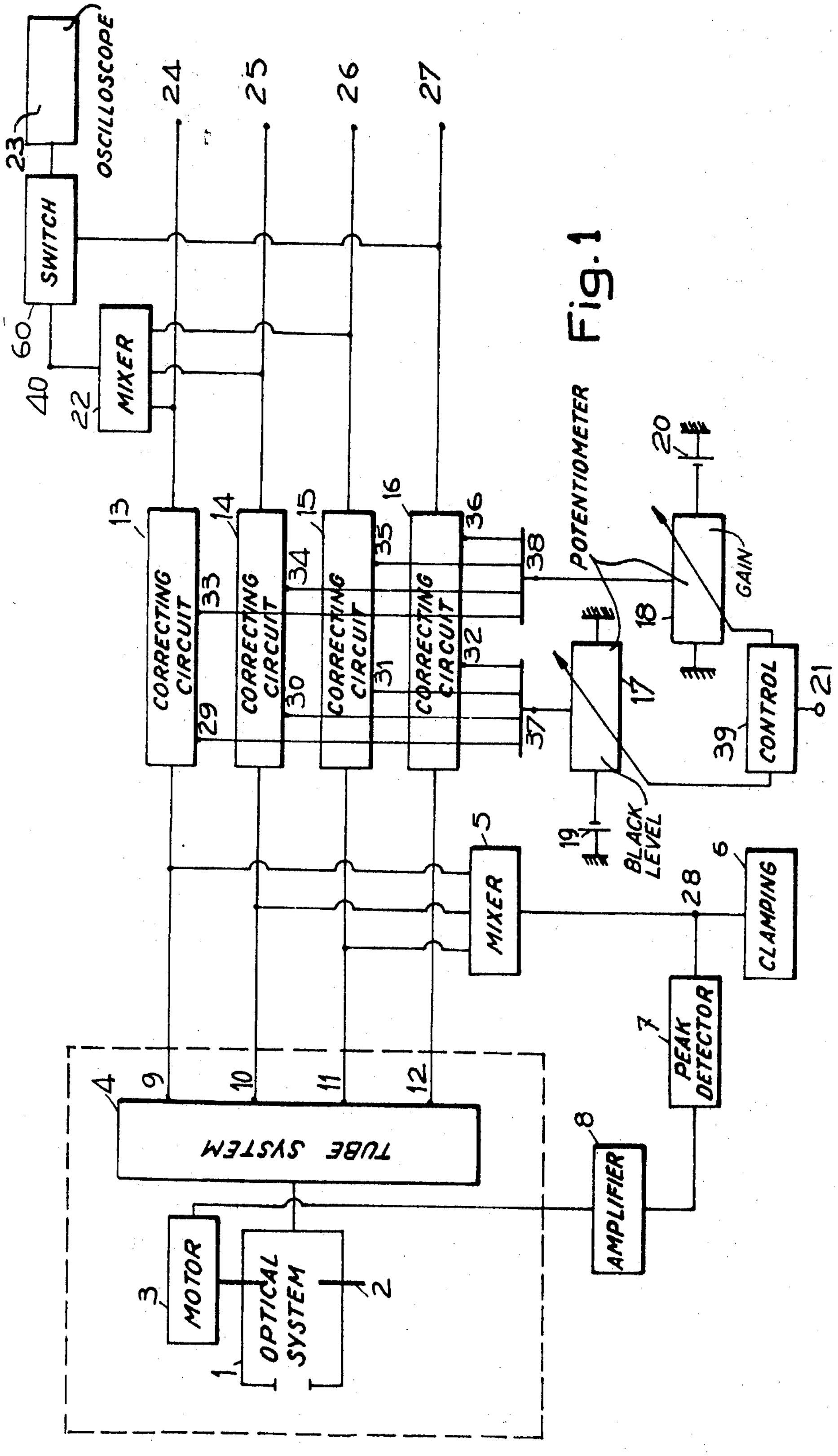
FIG. 1 is a block diagram of a colour television camera, according to the invention.

In FIG. 1, the optical system 1 of a colour television camera of any known type in which iris 2 can be controlled by a motor 3, is illustrated. The light is directed onto the tube system 4, of any known type, which comprises camera tubes and their amplifiers and furnishes the primary colour signals, red, green, blue and if desired a luminance signal, at the respective signal outputs 9, 10, 11 and 12, which are in turn connected to the respective correcting circuits 13, 14, 15 and 16 with the respective outputs 24, 25, 26 and 27.

Each of the three primary colour signals is also fed, prior to correction, to a mixer 5 whose output 28 is coupled to the clamping device 6 and to the motor 3 through a peak detector 7 and an amplifier 8.

The correcting circuits 13, 14, 15 and 16 are identical and comprise an adjustable black level resetting circuit electrically connected in series with a variable gain video and amplifier. These circuits 13 to 16 may be of an any well known type, they possess respective control inputs 29, 30, 31, 32 connected to a terminal 37 to which the black level setting control voltage is applied, and also possess further respective control inputs 33, 34, 35 and 36, which are connected to a terminal 38 to which the gain control voltage is applied.

Terminals 37 or 38 are respectively supplied through the medium of the corresponding potentiometers 17 or 18, to which a fixed bias voltage 19 or 20 is applied through the input. The two potentiometers are ganged by a mechanical arrangement 39 and have a single control 21.

After correction, the three primary colour signals, are also fed to a mixer 22 which at 40 supplies a mixed signal to an oscilloscope 23, if need be through the medium of a switch 60 by means of which said oscilloscope can be switched to the luminance channel 27 when there is one.

In accordance with the invention, the aperture of the iris 2 is made a function of the illumination of the scene which the camera is televising. A measurement of this illumination is obtained in the form of voltages supplied at the outputs 9, 10, and 11. The amplifiers are adjusted in as far as their gain is concerned, in order to present identical characteristics to the primary signals i.e. they product identical signals when the camera is directed at a white reference surface. These three voltages, are applied to the non-additive mixer 5, of a known type, and produce at its output 28 a signal whose level is at any instant equal to that of the strongest input signal i.e. corresponding to the predominant primary colour. After the absolute black level has been brought into line with the reference level, by means of a conventional clamping circuit 6, this signal is then subjected to peak detection, at 7 and then compared with a nominal level of 1 volt, in a well known manner to supply a differential voltage for operating the motor 3 through the medium of an amplifier 8.

The gain of this amplifier which is entirely conventional is sufficiently high in order to bring the signal peak as close as may be to the desired nominal level of 1 volt and thus achieve the best possible operation of the camera tubes.

According to a main feature of the invention means are provided for effecting by a single control the adjustment of both the gain and the black level. This is made more convenient due to the above described automatic adjustment of the diaphragm aperture.

Figure 2:
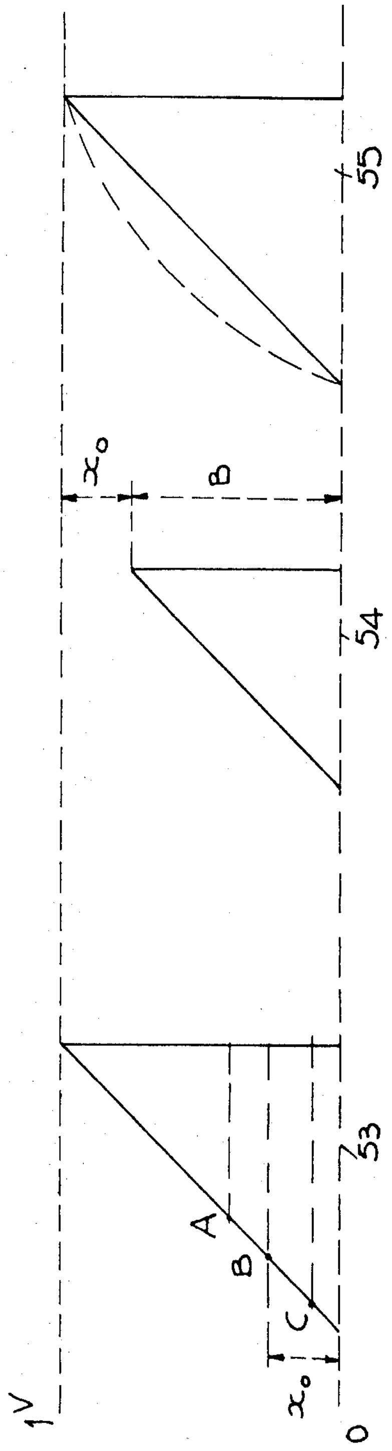
FIG. 2 is an explanatory diagram.

The diagram 53 of FIG. 2 illustrates the varying level of the photometric signal directly obtained from a surface presenting a linear illumination variation from black to white. The 0 volt level corresponds to absolute black or reference level and the 1 volt level corresponds to absolute white. A and C designate, for example, the minimum illumination levels which can be observed in practice in given scenes in which absolute black does never occur, B is then a mean minimum illumination value corresponding to a level difference $x_0$ with respect to the absolute black. After resetting the black level i.e. after alignment of the minimum level with the reference level, the signal is as illustrated in the diagram 54. In order to achieve maximal signal amplitude variation, as shown in the diagram 55, the gain must be boosted by the ratio of 1 to $1-x_0$. The gain variation $dg$ is thus associated with a variable shift $x$ in accordance with an equation of the form: $dg=\frac{1}{1-x}$. The potentiometers 17 and 18 which respectively effect the black level resetting and the adjustment of the gain can therefore be ganged and have a single control 21, provided only that the mechanical coupling takes care of the above function, of the law of variation of the potentiometers and of the response curves of the correcting circuits.

In practice, the average amount $x_0$ by which the black level needs to be shifted does generally not exceed ± 15 percent of the peak amplitude of the signal and therefore the function $$dg = \frac{1}{1-x}$$

can be approximately stated as $dg = 1 + x$, this being a linear function.

Accordingly, and if the black level setting and the gain variation are both linear functions of the control voltage, if both potentiometers are linear, and if the ohmic resistances of the two potentiometers and the DC voltages applied to points 19 and 20 correspond to characteristics of the control circuit so that the equality above is implemented, it will suffice to mount both potentiometers on the same spindles.

In the diagram 55 of FIG. 2, the gamma correction curve has been shown in chain dot, it is mentioned as a reminder.

Figure 3:
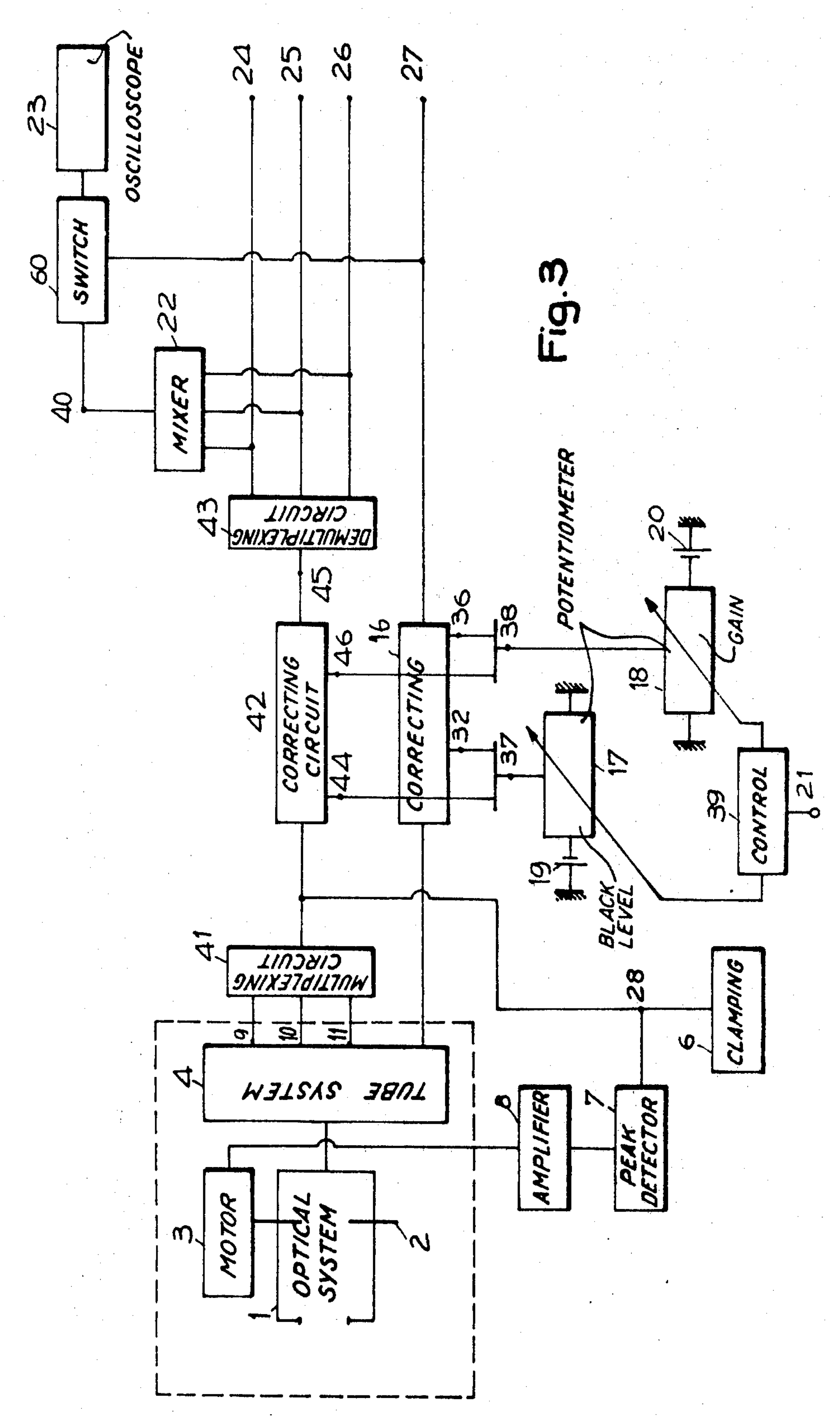
FIG. 3 illustrates another television camera according to the invention.

FIG. 3 shows a camera in which the three primary colour signals 9, 10 and 11 are multiplexed in a single multiplexing circuit 41, are corrected in a circuit 42 which may be identical to the circuits 13 to 16 and has an input for the black level resetting control voltage 44 and an input for the gain control voltage 46, and are then subsequently separated in a demultiplexing circuit 43.

The input 28 of the iris control circuit is connected directly to the output of the multiplexing circuit 41, the mixer 5 being dispensed with.

The remainder of the diagram is identical to that of FIG. 1.

The operation of the circuits 41 and 43 is described in the above mentioned copending U.S. Pat. Application.

To the advantages inherent to the structure described therein, should be added in the present instance the fact that the mixer 5 is no longer necessary.

Figure 4:
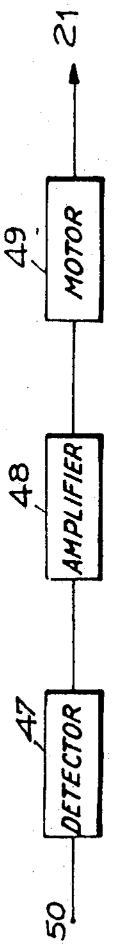
FIG. 4 is a block diagram of a circuit for automatical black level setting and gain adjustment.

The single control 21 may be made completely automatic. This may be achieved, for example, by means of the circuit shown in FIG. 4, all the elements of which are known per se. This circuit comprises in series an input 50, a detector 47, an amplifier 48 and a motor 49 which drives the control 21.

The operation of the circuit is as follows: the input 50 is supplied with the nonadditive signal derived from the primary colour signals after correction and taken, for example, from the terminal 40 in the case of the FIG. 1, or from the point 45 in the case of the FIG. 3.

This signal is processed in the detector 47 which detects the shift between the actual black level and the reference level. The signal thus obtained is used to operate the control 21, after amplification in 48, through the medium of the motor 49 which adjusts the control 21 until the actual black level is reset to the reference level.

Of course the invention is not limited to the embodiments described and shown which were given solely by way of example.

I claim:

1. A colour television camera comprising: an analysis system including a tube system, an optical system positioned for directing luminous energy on said tube system, said optical system comprising an iris, and *n* outputs, where *n* is a positive integer greater than 1, for delivering *n* electrical signals derived from said tube system; *n* black level and gain correcting circuits associated with said *n* signals and respectively coupled to said *n* outputs, each of said *n* correcting circuits comprising a first control input for receiving a first control signal for adjusting the black level of the associated signal and a second control input for receiving a second control signal for adjusting the gain of said associated signal; first means for supplying said first control signal to said first control inputs of said *n* correcting circuits and second means for supplying said second control signal to said second control inputs of said *n* correcting circuits; said first and second means having respective control means; and means for ganging said respective control means for simultaneous operation thereof.

2. A colour television camera according to claim 1, comprising a nonadditive mixer coupled to said *n* outputs, a peak detector coupled to said mixer and further control means, coupled to said detector, for adjusting the aperture of said iris.

3. A colour television camera according to claim 1 wherein *n* is equal to four; said analysis system delivering three primary colour signals and a luminance signal.

4. A colour television camera according to claim 1 wherein *n* is equal to two, said analysis system delivering three primary colour signals, time multiplexed in a single channel, and a luminance signal.

5. A colour television camera according to claim 1, wherein said first and second means include potentiometers having respective sliders ganged to each other.

6. A colour television camera according to claim 1, further comprising means, coupled to said outputs of said respective correcting circuits, for detecting the shift between the actual black level at the outputs of said correcting circuits and the reference level, and means coupled to said detecting means for controlling said respective control means.